A. BARKER.
Cultivators and Markers.
No. 151,530.                              Patented June 2, 1874.
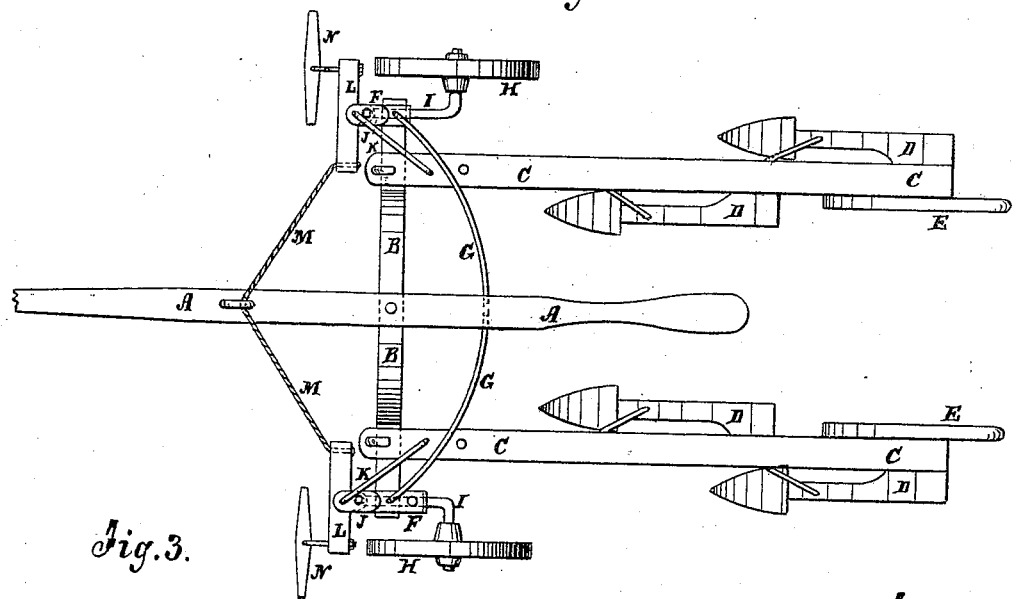
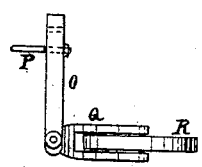
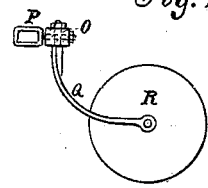
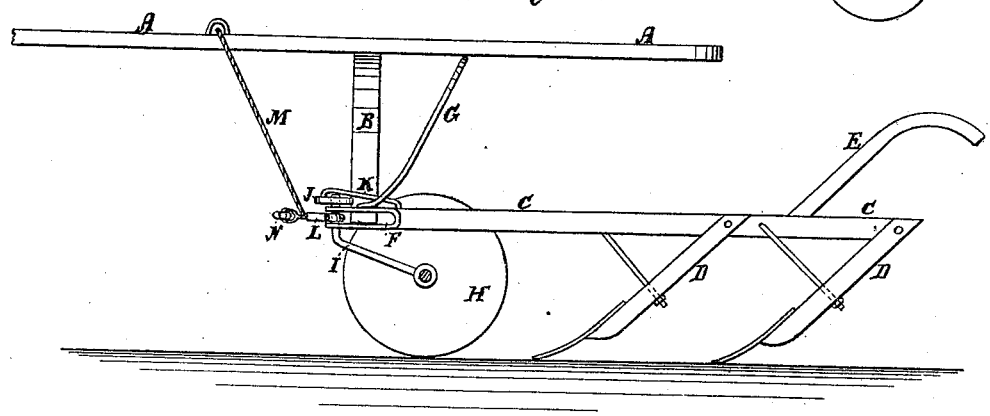
WITNESSES:                              INVENTOR:
BY
ATTORNEYS.

UNITED STATES PATENT OFFICE.

AMOS BARKER, OF NEBRASKA CITY, NEBRASKA.

IMPROVEMENT IN CULTIVATORS AND MARKERS.

Specification forming part of Letters Patent No. 151,530, dated June 2, 1874; application filed March 14, 1874.

*To all whom it may concern:*

Be it known that I, AMOS BARKER, of Nebraska City, in the county of Otoe and State of Nebraska, have invented a new and useful Improvement in Combined Cultivator and Marker, of which the following is a specification:

Figure 1 is a top view of my improved machine arranged as a cultivator. Fig. 2 is a side view of the same. Fig. 3 is a top view of the marking attachment. Fig. 4 is a side view of the same.

Similar letters of reference indicate corresponding parts.

The invention relates to a wheeled or riding cultivator whose axle is adapted for attachment of marking devices, as hereinafter described.

A is the tongue, which is attached to the middle part or bow of the bar B, and the rear end of which projects in the rear of said bar to serve as or to receive a seat for the driver. The end parts of the curved bar B are horizontal, and to them are pivoted the forward ends of the plow-beams C, to which are attached standards D and handles E in the ordinary manner. F are coupling-blocks, placed upon the ends of the curved bar B, where they are secured in place by the ends of the curved brace G, which ends should have nuts screwed upon them to keep them in place. The brace G is made longer than the bar B, and its middle part is secured to the tongue A in the rear of said bar B. H are small wheels, which revolve upon the journals of the axles I, which are bent twice at right angles, and the ends of which pass up through the forward parts of the connecting-blocks F, and are squared off to receive the lever-blocks J, in the forward parts of which are formed holes to receive the hooks formed upon the forward ends of the rods K. The rods K have hooks formed upon their rear ends also, which enter holes formed in the plow-beams C, so that the movement of the plow-beams may control the wheels. L are draft-bars, which are connected with the upper part of the axles I by staples or other convenient means. The inner ends of the draft-bars L are connected by a chain, M, which passes over a pulley pivoted to the tongue A. With the outer ends of the draft-bars L are connected the whiffle-trees N, to which the draft is applied. O is a bar, to which, near one end, is swiveled an eyebolt, P, the eye of which is made of such a size and shape as to fit upon the ends of the curved bar B, several holes being formed in the bar O to receive the eyebolt P, so that it may be adjusted as required. To the other end of the bar O is swiveled the upper end of the curved standard Q, to the slotted lower end of which is pivoted the marking-wheel R.

By this construction, by detaching the plow-beams C and attaching two of the devices O P Q R, four rows may be marked at a time.

Having thus described my invention, I claim as new and desire to secure by Letters Patent—

1. The arched bar B with horizontal ends, in combination with coupling-blocks F and bent axles I, adapted for the attachment of wheels H or R, as shown and described, for the purpose specified.

2. The combination of the lever-blocks J and hook-rods K with the bent axles I, wheels H, and plow-beams C, substantially as herein shown and described.

AMOS BARKER.

Witnesses:
    H. A. NEWMAN,
    ED. F. HOLMES.